US012398661B2

(12) United States Patent
Bisson et al.

(10) Patent No.: US 12,398,661 B2
(45) Date of Patent: Aug. 26, 2025

(54) CONTAINMENT RING FOR GAS TURBINE ENGINE

(71) Applicant: Pratt & Whitney Canada Corp., Longueuil (CA)

(72) Inventors: Jocelyn Bisson, Saint-Basile-le-Grand (CA); Guy Lefebvre, St-Bruno (CA)

(73) Assignee: PRATT & WHITNEY CANADA CORP., Québec (CA)

( * ) Notice: Subject to any disclaimer, the term of this patent is extended or adjusted under 35 U.S.C. 154(b) by 0 days.

(21) Appl. No.: 18/426,019

(22) Filed: Jan. 29, 2024

(65) Prior Publication Data

US 2025/0243785 A1  Jul. 31, 2025

(51) Int. Cl.
*F01D 25/24* (2006.01)
*F02C 7/00* (2006.01)

(52) U.S. Cl.
CPC .............. *F01D 25/243* (2013.01); *F02C 7/00* (2013.01)

(58) Field of Classification Search
CPC ................................................... F01D 21/045
See application file for complete search history.

(56) References Cited

U.S. PATENT DOCUMENTS

| | | | |
|---|---|---|---|
| 1,166,820 | A | 1/1916 | Doherty |
| 4,639,188 | A | 1/1987 | Swadley |
| 5,259,724 | A | 11/1993 | Liston et al. |
| 6,206,631 | B1 | 3/2001 | Schilling |
| 6,575,694 | B1 | 6/2003 | Thompson et al. |
| 6,637,186 | B1 | 10/2003 | Van Duyn |
| 7,874,136 | B2 | 1/2011 | Heyerman |
| 10,533,450 | B2 | 1/2020 | Kling et al. |
| 10,731,662 | B2 | 8/2020 | Crutchfield |
| 11,008,887 | B2 | 5/2021 | Hall et al. |
| 11,015,482 | B2 | 5/2021 | Kasal et al. |
| 11,549,442 | B2 | 1/2023 | Asdev et al. |
| 11,668,205 | B2 | 6/2023 | Guymon et al. |
| 11,698,001 | B2 | 7/2023 | Kasal et al. |
| 11,821,326 | B2 | 11/2023 | Vanapalli et al. |
| 2016/0273380 | A1 | 9/2016 | Stiehler et al. |
| 2016/0341075 | A1 | 11/2016 | Liu et al. |
| 2017/0198604 | A1* | 7/2017 | Lefebvre ................. F01D 25/30 |
| 2022/0251969 | A1* | 8/2022 | Guymon ............... F01D 21/045 |

FOREIGN PATENT DOCUMENTS

| | | |
|---|---|---|
| EP | 1073828 B1 | 6/2004 |
| EP | 3090148 B1 | 5/2021 |
| FR | 3004215 A1 | 10/2014 |

OTHER PUBLICATIONS

European Search Report corresponding to EP Application No. 25154821.0; Issue Date, Jun. 17, 2025, 7 pages.

* cited by examiner

*Primary Examiner* — David P. Olynick
(74) *Attorney, Agent, or Firm* — CANTOR COLBURN LLP

(57) ABSTRACT

A containment ring assembly for a turbine casing assembly, including: a first inner containment ring; a second inner containment ring; an outer containment ring, the first inner containment ring and the second inner containment ring being radially inward from the outer containment ring, wherein a radial space is located between the outer containment ring and the first inner containment ring and the second inner containment ring, the radial space allowing deformation of the first inner containment ring and the second inner containment ring.

20 Claims, 5 Drawing Sheets

CONTAINMENT RING FOR GAS TURBINE ENGINE

BACKGROUND

This disclosure relates to structures for use in gas turbine engines, and more particularly to a containment ring for use in a gas turbine engine.

Gas turbine engines have a turbine casing assembly. The turbine casing assembly may include a containment ring. It is desirable to decrease the weight of a containment ring while providing the desired containment.

BRIEF DESCRIPTION

Disclosed is a containment ring assembly for a turbine casing assembly, including: a first inner containment ring; a second inner containment ring; an outer containment ring, the first inner containment ring and the second inner containment ring being radially inward from the outer containment ring, wherein a radial space is located between the outer containment ring and the first inner containment ring and the second inner containment ring, the radial space allowing deformation of the first inner containment ring and the second inner containment ring.

In addition to one or more of the features described above, or as an alternative to any of the foregoing embodiments, the first inner containment ring is secured to the second inner containment ring by a plurality of frangible tab members.

In addition to one or more of the features described above, or as an alternative to any of the foregoing embodiments, the outer containment ring is secured to the first inner containment ring by a plurality of frangible tab members.

In addition to one or more of the features described above, or as an alternative to any of the foregoing embodiments, the outer containment ring is secured to the second inner containment ring by a plurality of frangible tab members.

In addition to one or more of the features described above, or as an alternative to any of the foregoing embodiments, the second inner containment ring is secured to a flange portion by a plurality of frangible tab members.

In addition to one or more of the features described above, or as an alternative to any of the foregoing embodiments, the plurality of frangible tab members are separated by a plurality of openings.

In addition to one or more of the features described above, or as an alternative to any of the foregoing embodiments, the first inner containment ring defines a first stage containment zone and the outer containment ring defines a second stage containment zone and the second inner containment ring defines a third stage containment zone.

In addition to one or more of the features described above, or as an alternative to any of the foregoing embodiments, the first inner containment ring is secured to the second inner containment ring by a plurality of frangible tab members.

In addition to one or more of the features described above, or as an alternative to any of the foregoing embodiments, the outer containment ring is secured to the first inner containment ring by a plurality of frangible tab members.

In addition to one or more of the features described above, or as an alternative to any of the foregoing embodiments, the outer containment ring is secured to the second inner containment ring by a plurality of frangible tab members.

Also disclosed is a turbine casing assembly, including: an outer structural case; and a containment ring, including: a first inner containment ring; a second inner containment ring; an outer containment ring, the first inner containment ring and the second inner containment ring being radially inward from the outer containment ring, wherein a radial space is located between the outer containment ring and the first inner containment ring and the second inner containment ring, the radial space allowing deformation of the first inner containment ring and the second inner containment ring.

In addition to one or more of the features described above, or as an alternative to any of the foregoing embodiments, the first inner containment ring is secured to the second inner containment ring by a plurality of frangible tab members.

In addition to one or more of the features described above, or as an alternative to any of the foregoing embodiments, the outer containment ring is secured to the first inner containment ring by a plurality of frangible tab members.

In addition to one or more of the features described above, or as an alternative to any of the foregoing embodiments, the outer containment ring is secured to the second inner containment ring by a plurality of frangible tab members.

In addition to one or more of the features described above, or as an alternative to any of the foregoing embodiments, the second inner containment ring is secured to a flange portion by a plurality of frangible tab members and the flange portion is secured to the outer structural case.

In addition to one or more of the features described above, or as an alternative to any of the foregoing embodiments, the plurality of frangible tab members are separated by a plurality of openings.

In addition to one or more of the features described above, or as an alternative to any of the foregoing embodiments, the first inner containment ring defines a first stage containment zone and the outer containment ring defines a second stage containment zone and the second inner containment ring defines a third stage containment zone.

In addition to one or more of the features described above, or as an alternative to any of the foregoing embodiments, the first inner containment ring is secured to the second inner containment ring by a plurality of frangible tab members.

In addition to one or more of the features described above, or as an alternative to any of the foregoing embodiments, the outer containment ring is secured to the first inner containment ring by a plurality of frangible tab members.

Also disclosed is a gas turbine engine, including: a compressor section; a combustor; a turbine section; and a turbine casing assembly, including: an outer structural case; and a containment ring, including: a first inner containment ring; a second inner containment ring; an outer containment ring, the first inner containment ring and the second inner containment ring being radially inward from the outer containment ring, wherein a radial space is located between the outer containment ring and the first inner containment ring and the second inner containment ring, the radial space allowing deformation of the first inner containment ring and the second inner containment ring.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
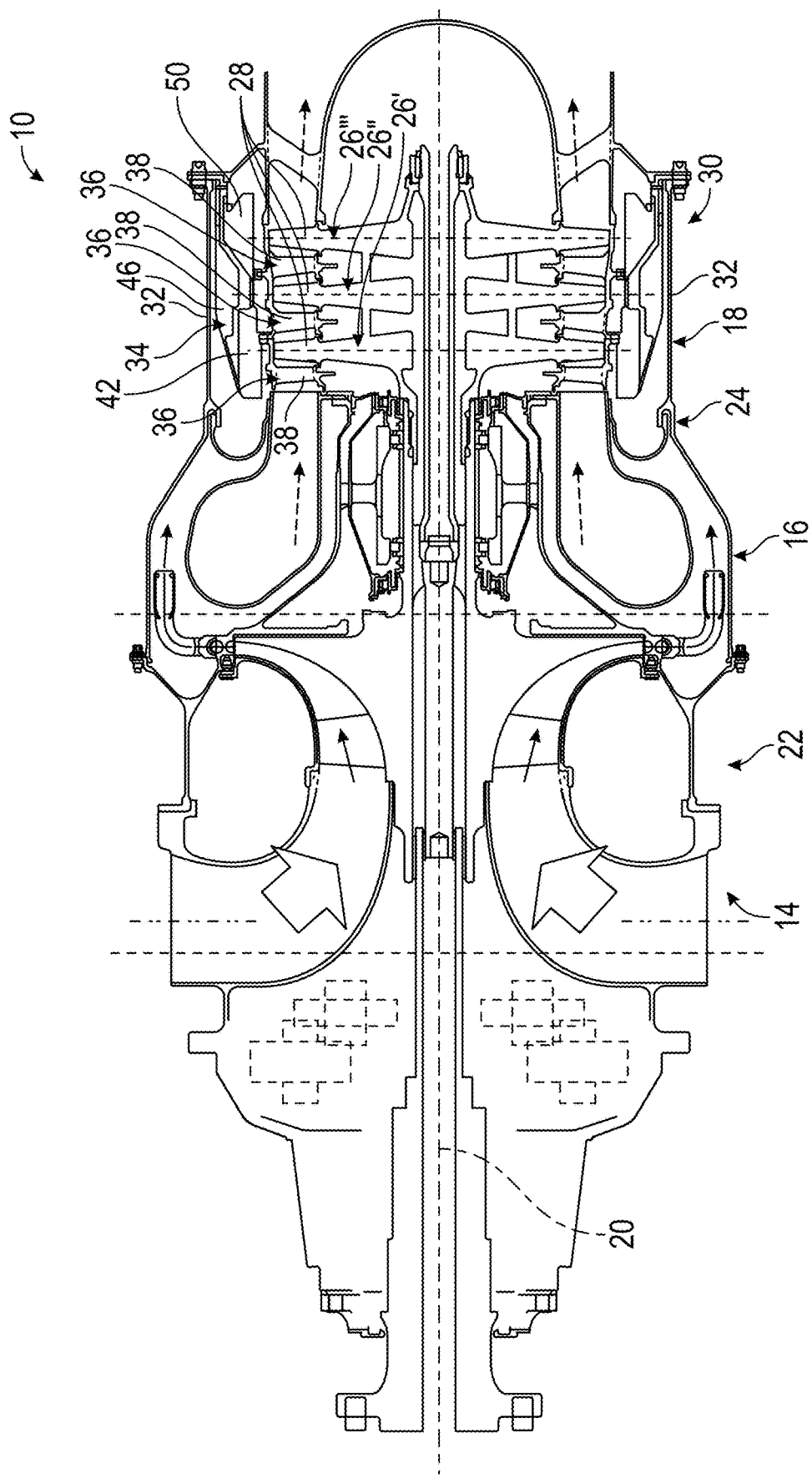
FIG. 1 is a schematic cross-sectional view of a gas turbine engine.

FIG. 1 illustrates a gas turbine engine 10, generally comprising in serial flow communication a compressor section 14 for pressurizing the air, a combustor section 16 in which the compressed air is mixed with fuel and ignited for generating an annular stream of hot combustion gases, and a turbine section 18 for extracting energy from the combustion gases. Some of the rotatable components of the gas turbine engine 10 rotate about a longitudinal center axis 20 of the gas turbine engine 10.

The gas turbine engine 10 has a "cold" section 22 and a "hot" section 24. The cold section 22 includes those components of the gas turbine engine 10 which are upstream (relative to the direction gases flow through the gas turbine engine 10) of the combustor 16 and have thus not been exposed to the hot combustion gases. The hot section 24 includes the combustor 16 and those components of the gas turbine engine 10 which are downstream of the combustor 16. The components of the hot section 24 are thus exposed to the hot combustion gases generated in the combustor 16. The gases flowing through the cold section 22 have a lower temperature than the gases flowing through the hot section 24.

The hot section 24 includes the combustor 16, the turbine section 18 and a case downstream of the turbine section 18 for conveying the exhaust gases. The turbine section 18 includes one or more rotors 26 each having a plurality of rotor blades 28 secured to a hub 29 which rotates about the center axis 20 and extract energy from the combustion gases. In one implementation the turbine blades 28 are integrally formed with the hub 29 in order to form a single component referred to as an integrally bladed rotor or IBR 26. The hot section 24 includes stationary bodies which enclose other components of the hot section 24 and define the gas path for the hot combustion gases. These stationary bodies are sometimes referred to as casings or cases which collectively define radially-outer boundaries of the gas turbine engine.

Referring now to at least FIGS. 1-4, the casing of the gas turbine engine 10 includes a turbine casing assembly 30 which is part of the hot section 24. The turbine casing assembly 30 is a group of casing components that form part of the turbine section 18 and enclose the combustion gases. The turbine casing assembly 30 may be provided as disassembled components which may then be assembled in a suitable facility. The turbine casing assembly 30 includes an outer structural case 32, a containment ring or containment ring assembly 34, and at least one vane ring 36. The at least one vane ring 36 having at least one vane 38 secured thereto. In one embodiment, the least one vane ring 36 having the at least one vane 38 may be formed as a single component.

In one embodiment, the outer structural case 32, the containment ring or containment ring assembly 34, and the least one vane ring 36 have circular portions or configurations. As illustrated in the attached FIGS., a three stage rotor assembly is illustrated or in other words three rotors 26 are illustrated and may be referred to as a first stage rotor 26', a second stage rotor 26" and a third stage rotor 26'" respectively.

The present disclosure is generally directed to a containment ring or containment ring assembly 34 having a three containment ring configuration where each ring has brittle joints. The purpose of these brittle joints is to fracture to ensure that each containment ring of the containment ring assembly 34 can absorb the kinetic energy of a fragment and deform freely without transmitting the load to the engine structure in the event of an overspeed tri-hub failure. The geometry of the containment ring or containment ring assembly 34 allows it to meet containment criteria even in an engine with a compact profile having three narrow turbine rotors.

Figure 2:
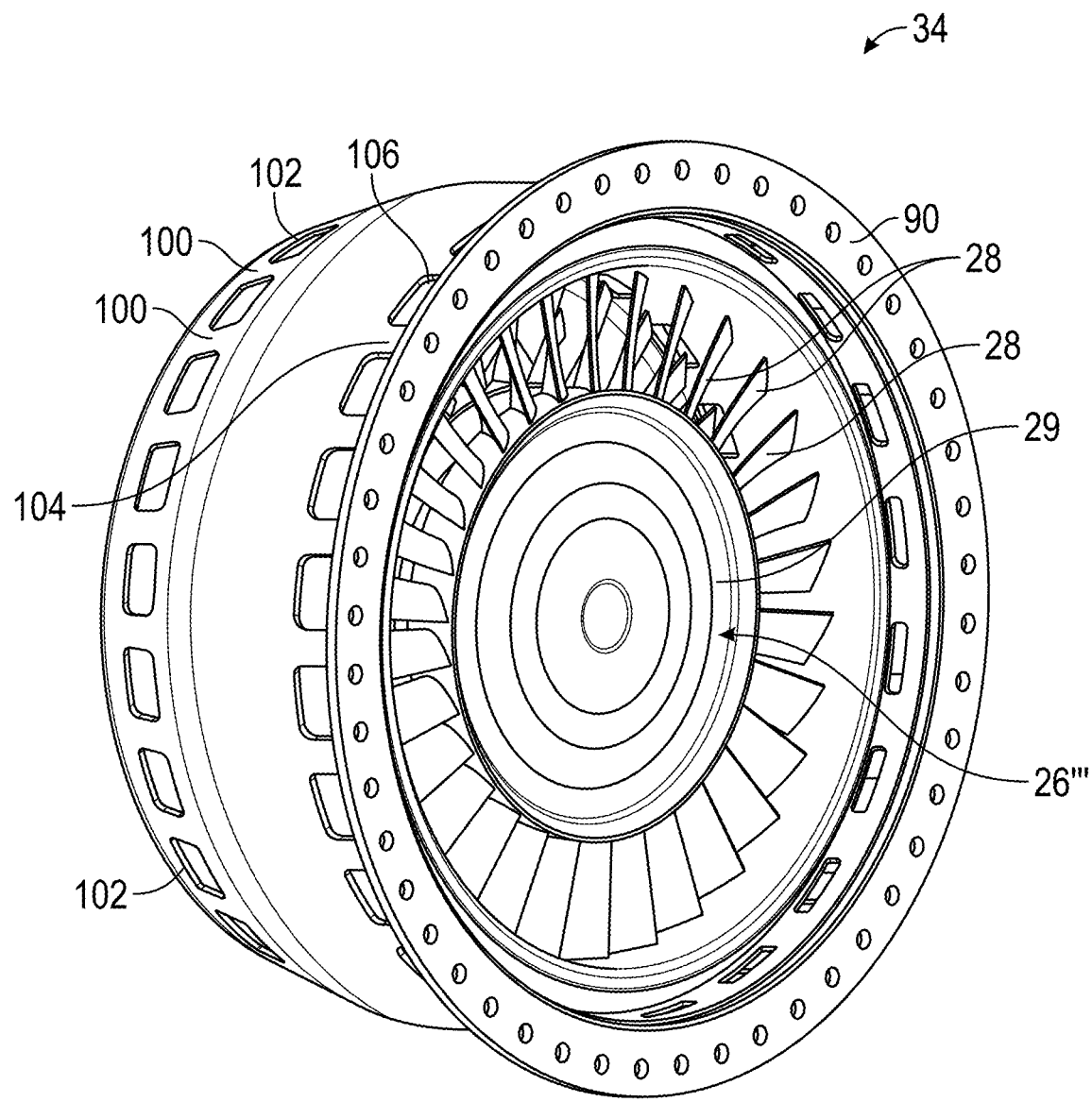
FIG. 2 is a perspective view of a containment ring and rotors in accordance with the present disclosure.
Figure 3:
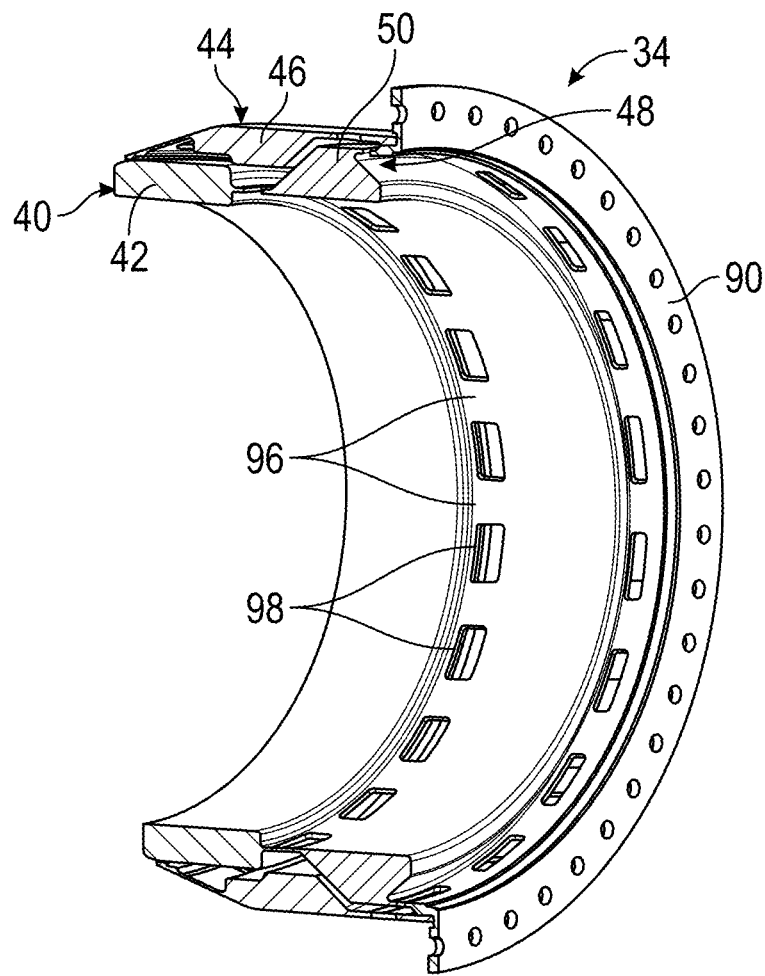
FIG. 3 is a perspective cross-sectional view of the containment ring and rotors illustrated in FIG. 2.
Figure 4:
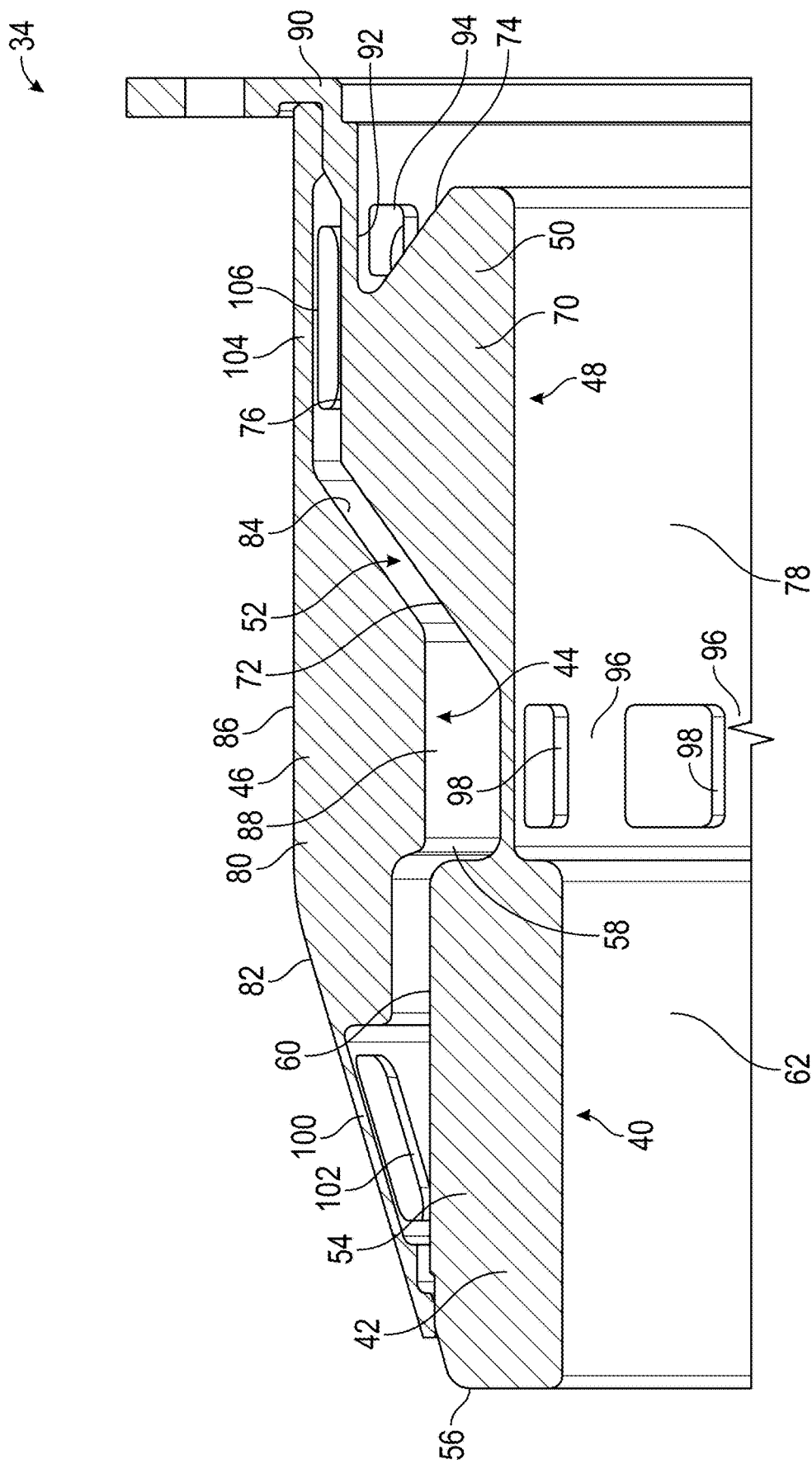
FIG. 4 is an enlarged perspective cross-sectional view of a portion of the containment ring in accordance with the present disclosure.

FIG. 2 is a perspective view of a containment ring or containment ring assembly 34 configured to surround three rotors 26 in accordance with the present disclosure and FIG. 3 is a cross-sectional view of the containment ring or containment ring assembly 34 illustrated in FIGS. 1 and 2. FIG. 4 is an enlarged perspective cross-sectional view of a portion of the containment ring or containment ring assembly 34 in accordance with the present disclosure.

In accordance with the present disclosure, the containment ring or containment ring assembly 34 has three radially superposed containment zones, defined by a first stage containment zone 40 comprising a first inner containment ring 42, and a second stage containment zone 44 comprising an outer containment ring 46 and a third stage containment zone 48 comprising a second inner containment ring 50.

The first inner containment ring 42 being aligned with the first stage rotor 26' and the outer containment ring 46 being aligned with the second stage rotor 26" and the second inner containment ring 50 being aligned with the third stage rotor 26'". The containment rings 42, 46, and 50 are configured and dimensioned to absorb the kinetic energy of a fragment by plastic deformation of a respective one of the first stage rotor 26', the second stage rotor 26", and the third stage rotor 26'".

The outer containment ring 46 may also be referred to as a central containment ring superimposed on the two inner rings 42 and 50 and is configured to overlap the two lower inner rings 42 and 50 and meet a critical angle required to contain the fragments from a rotor stage failure.

A radial space 52 is located between the two containment rings 42, 50 and the containment ring 46. The radial space 52 allows the first inner containment ring 42 and the second inner containment ring 50 to deform freely with regard to the outer containment ring 46. In other words, the radial space 52 allows deformation of the first inner containment ring 42 and the second inner containment ring 50 during a containment event (e.g., the containment rings or containment ring assembly 34 retaining or containing a fragment). In accordance with the present disclosure, the thickness of the containment rings 42, 46 and 50 can be adapted depending upon the rotor 26 geometries and speed.

Referring now to at least FIGS. 1-4, the first inner containment ring 42 has a main body portion 54. The main body portion 54 has a forward end 56 and an aft end 58, an outer periphery 60, and an inner periphery 62. As used herein, the outer periphery 60 is radially outward from the inner periphery 62. In addition, and when the inner containment ring 42 is installed in the engine 10, the outer periphery 60 is radially further from the central axis 20 than the inner periphery 62. In addition and as used herein, the forward end 56 is closer to the combustor section 16 than the aft end 58 when the containment ring or containment ring assembly 34 is secured to the engine 10.

The second inner containment ring 50 has a main body portion 70. The main body portion 70 has a forward end 72 and an aft end 74, an outer periphery 76, and an inner periphery 78. As used herein, the outer periphery 76 is radially outward from the inner periphery 78. In addition, and when the second inner containment ring 50 is installed in the engine 10, the outer periphery 76 is radially further from the central axis 20 than the inner periphery 78. In addition and as used herein, the forward end 72 is closer to the combustor section 16 than the aft end 74 when the containment ring or containment ring assembly 34 is secured to the engine 10.

The outer containment ring 46 has a main body portion 80. The main body portion 80 has a forward end 82 and an aft end 84, an outer periphery 86, and an inner periphery 88. As used herein, the outer periphery 86 is radially outward from the inner periphery 88. In addition, and when the outer containment ring 46 is installed in the engine 10, the outer periphery 86 is radially further from the central axis 20 than the inner periphery 88. In addition and as used herein, the forward end 82 is closer to the combustor section 16 than the aft end 84 when the containment ring or containment ring assembly 34 is secured to the engine 10.

The second inner containment ring 50 also has a flange portion 90 secured thereto. The flange portion 90 is configured to secure the second inner containment ring 50 and the containment ring or containment ring assembly 34 to the outer structural case 32. The flange portion 90 being secured to the main body portion 70 via a plurality of tabs or frangible tab members 92. In one embodiment, each of the plurality of tabs or frangible tabs members 92 are separated from each other by a plurality of openings 94. Still further and in one non-limiting embodiment, the tab members 94 are integrally formed with the second inner containment ring 50 so that they form a single unitary structure.

In addition, the aft end 58 of the main body portion 54 of the first inner containment ring 42 is secured to the forward end 72 of the main body portion 70 of the second inner containment ring 50 by a plurality of tabs or frangible tab members 96. In one embodiment, each of the plurality of tabs or frangible tab members 96 are separated from each other by a plurality of openings 98. In one non-limiting embodiment, the first inner containment ring 42, the second inner containment ring 50 and the flange portion 90 are integrally formed so that they form a single unitary structure.

The forward end 82 of the main body portion 80 of the outer containment ring 46 is secured to the main body portion 54 of the first inner containment ring 42 by a plurality tabs or frangible tab members 100. In one embodiment, each of the plurality of tabs or frangible tab members 100 are separated from each other by a plurality of openings 102.

The aft end 84 of the main body portion 80 of the outer containment ring 46 is secured to the flange portion 90 by a plurality tabs or frangible tab members 104. In one embodiment, each of the plurality of tabs or frangible tab members 104 are separated from each other by a plurality of openings 106.

In one embodiment, the radial space 52 is in fluid communication with the plurality of openings 94, 98, 102 and 106. In addition, the plurality of tabs or frangible tab members 92, 96, 100 and 104 provide brittle frangible zones or joints that can fracture to ensure that each containment ring of the containment ring assembly 34 can absorb the kinetic energy of a fragment and deform freely without transmitting the load to the engine structure in the event of an overspeed tri-hub failure.

In one non-limiting embodiment, the aft end 84 is secured to the flange portion 90 and the forward end 82 is secured to the first inner containment ring 42. In one non-limiting embodiment, the securement of the respective ends 82 and 84 is achieved by rivets 89 or any other suitable means e.g. welding or equivalents thereof provide to a tight fit. These connections or tight fits will improve the dynamic response of the inner containment rings 42 and 50 with respect to the outer containment ring 46. In an alternative embodiment, the flange portion 90 is integrally formed with the outer containment ring 46 as opposed to the second inner containment ring 50 and the aft end 74 of the main body portion 70 of the second inner containment ring 50 is secured to the flange portion 90. In one non-limiting embodiment, the first inner containment ring 42, the second inner containment ring 50, the outer containment ring 46 and the flange portion 90 may be formed from nickel based alloys or any other suitable material.

Figure 5:
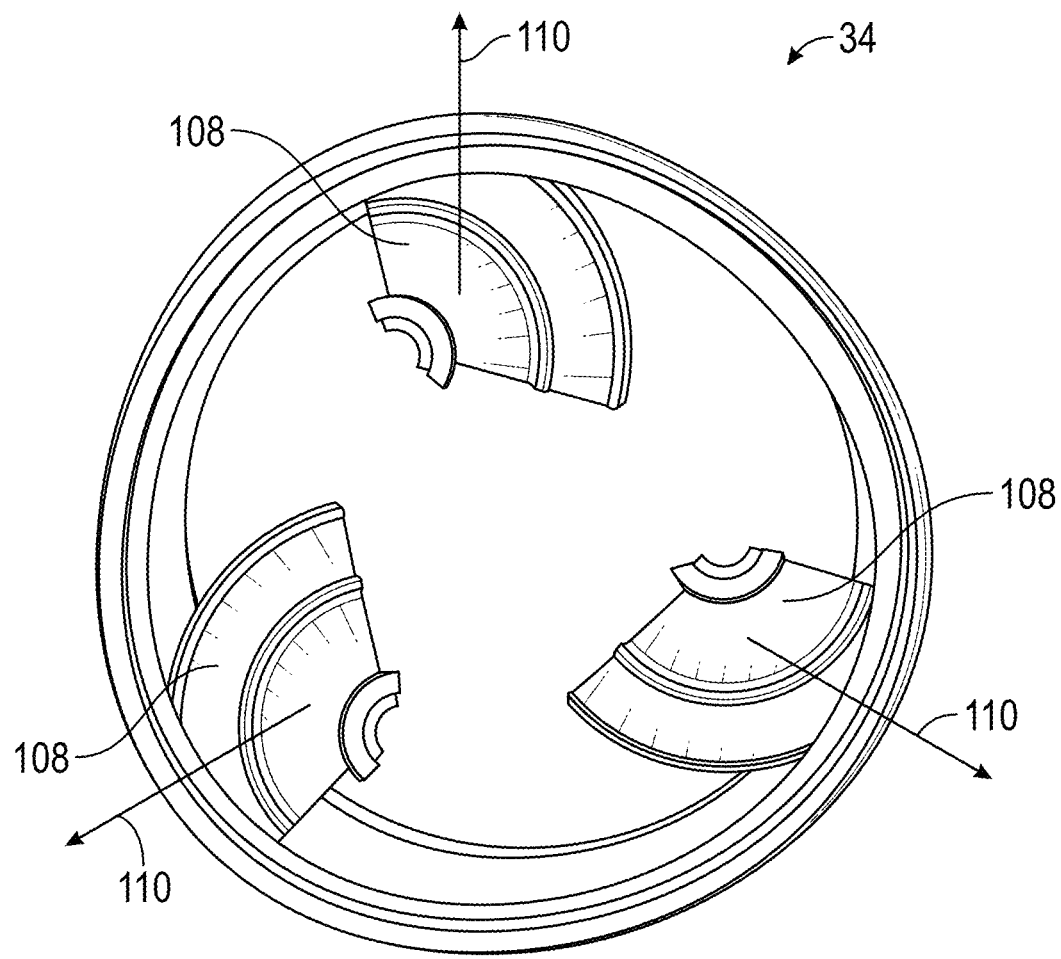
FIG. 5 is an illustration of containment of a rotor by the containment ring in accordance with the present disclosure.

Referring now to FIGS. 1-5, the first inner containment ring 42, the second inner containment ring 50 and the outer containment ring 46 are designed to absorb the kinetic energy of disc fragments 108 in the direction of arrows 110 in the event of a tri-hub fracture event. For example, in the event the first stage rotor 26' and/or the second stage rotor 26" and/or the third stage rotor 26'" has separated into fragments 108 illustrated in FIG. 5. Note, the description of a tri-hub fracture event is merely provided as an example and various embodiments of the present disclosure are not limited to this specific event. FIG. 5 is an illustration of containment of portions or fragments of anyone of the rotors 26', 26" and 26'" by the containment ring or containment ring assembly 34 in accordance with the present disclosure.

For example and in an uncontrolled overspeed event, rotating parts (turbine discs, compressor rotor, impeller, etc.) can fracture in three parts (tri-hub) and the high energy fragments are contained by the containment ring or containment ring assembly 34. As such and in accordance with the present disclosure, these fragments 108 are contained using the containment ring or containment ring assembly 34 of the present disclosure.

The present disclosure is directed to a containment ring or containment ring assembly 34 having a three containment ring configuration where each ring has brittle joints. The purpose of these brittle joints is to fracture to ensure that each containment ring of the containment ring assembly 34 can absorb the kinetic energy of a fragment and deform freely without transmitting the load to the engine structure in the event of an overspeed tri-hub failure. The geometry of the containment ring or containment ring assembly 34 allows it to meet containment criteria even in an engine with a compact profile having three narrow turbine rotors.

As such, an architecture of superimposed containment rings 42, 46 and 50 is provided to enable the design of brittle joints for each containment ring 42, 46 and 50.

The outer containment ring 46 is configured to stiffen the containment assembly 34 by means of two interference joints arranged at each end of the two rings, thus avoiding the problem of vibration generated by the introduction of fragile joints.

The outer containment ring 46 is superimposed on the two inner rings 42 and 50 and the outer containment ring 46 is configured to overlap the two lower rings 42 and 50 in order to a critical angle required to contain the fragments 108.

In an uncontrolled overspeed event, the critical rotating parts (turbine discs, compressor rotor, impeller, etc.) can fracture in three parts (tri-hub) and the high energy fragments need to be radially contained. When one of these fragment 108 hits the containment ring or containment assembly 34, the kinetic energy (KE) is absorbed by the potential energy (PE) of the rings 42, 46 and 50, which deform under the load. However, to allow deformation of the individual rings 42, 46 and 50, it is necessary for each of the containment rings 42, 46 and 50 to be supported by a fragile joint designed to break on contact with the fragment 108.

The necessary design requirement for a containment ring or containment ring assembly 34 is to maintain the integrity of the outer diameter of the ring, i.e. to prevent the fragment from piercing the whole radial thickness. However, and in order to meet this requirement, it requires large axial space to design the containment rings. The present disclosure comprises superimposing the outer containment ring 46 on top of the two inner rings 42, 50, thus meeting the minimum area required to contain fragments of each the rotors 26', 26" and 26'''.

The advantage of this concept allows the gas turbine engine 10 to be designed in a compact axial space while maintaining the containment requirements. As such, this allows the containment ring or containment assembly 34 to be used in a very small engine centerline. This allows the weight of the engine 10 to be within desired ranges without lengthening of the containment area, and therefore the overall length of the engine 10.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A containment ring assembly for a turbine casing assembly, comprising:
   a first inner containment ring, the first inner containment ring having a thickened main body portion, the thickened main body portion having a forward end and an aft end;
   a second inner containment ring, the second inner containment ring having a thickened main body portion, the thickened main body portion having a forward end and an aft end;
   an outer containment ring, the outer containment ring having a thickened main body portion, the thickened main body portion having a forward end and an aft end, the thickened main body portion of the outer containment ring being at least partially located between the aft end of the thickened main body portion of the first inner containment ring and the forward end of the thickened main body portion of the second inner containment ring, the first inner containment ring and the second inner containment ring being radially inward from the outer containment ring, wherein a radial space is located between the outer containment ring and the first inner containment ring and the second inner containment ring, the radial space allowing the first inner containment ring and the second inner containment ring to deform freely with regard to the outer containment ring.

2. The containment ring assembly as in claim 1, wherein the first inner containment ring is secured to the second inner containment ring by a first plurality of frangible tab members.

3. The containment ring assembly as in claim 2, wherein the outer containment ring is secured to the first inner containment ring by a second plurality of frangible tab members.

4. The containment ring assembly as in claim 3, wherein the outer containment ring is secured to the second inner containment ring by a third plurality of frangible tab members.

5. The containment ring assembly as in claim 4, wherein the second inner containment ring is secured to a flange portion by a fourth plurality of frangible tab members.

6. The containment ring assembly as in claim 5, wherein each of the first, second, third and fourth plurality of frangible tab members are separated from each other by one of a plurality of openings.

7. The containment ring assembly as in claim 1, wherein the first inner containment ring defines a first stage containment zone and the outer containment ring defines a second stage containment zone and the second inner containment ring defines a third stage containment zone.

8. The containment ring assembly as in claim 7, wherein the first inner containment ring is secured to the second inner containment ring by a first plurality of frangible tab members.

9. The containment ring assembly as in claim 8, wherein the outer containment ring is secured to the first inner containment ring by a second plurality of frangible tab members.

10. The containment ring assembly as in claim 9, wherein the outer containment ring is secured to the second inner containment ring by a third plurality of frangible tab members.

11. A turbine casing assembly, comprising:
    an outer structural case; and
    a containment ring, comprising:
      a first inner containment ring, the first inner containment ring having a thickened main body portion, the thickened main body portion having a forward end and an aft end;
      a second inner containment ring, the second inner containment ring having a thickened main body portion, the thickened main body portion having a forward end and an aft end;

an outer containment ring, the outer containment ring having a thickened main body portion, the thickened main body portion having a forward end and an aft end, the thickened main body portion of the outer containment ring being at least partially located between the aft end of the thickened main body portion of the first inner containment ring and the forward end of the thickened main body portion of the second inner containment ring, the first inner containment ring and the second inner containment ring being radially inward from the outer containment ring, wherein a radial space is located between the outer containment ring and the first inner containment ring and the second inner containment ring, the radial space allowing deformation of the first inner containment ring and the second inner containment ring to deform freely with regard to the outer containment ring.

12. The turbine casing assembly as in claim 11, wherein the first inner containment ring is secured to the second inner containment ring by a first plurality of frangible tab members.

13. The turbine casing assembly as in claim 12, wherein the outer containment ring is secured to the first inner containment ring by a second plurality of frangible tab members.

14. The turbine casing assembly as in claim 13, wherein the outer containment ring is secured to the second inner containment ring by a third plurality of frangible tab members.

15. The turbine casing assembly as in claim 14, wherein the second inner containment ring is secured to a flange portion by a fourth plurality of frangible tab members and the flange portion is secured to the outer structural case.

16. The turbine casing assembly as in claim 15, wherein each of the first, second, third and fourth plurality of frangible tab members are separated from each other by one of a plurality of openings.

17. The turbine casing assembly as in claim 11, wherein the first inner containment ring defines a first stage containment zone and the outer containment ring defines a second stage containment zone and the second inner containment ring defines a third stage containment zone.

18. The turbine casing assembly as in claim 17, wherein the first inner containment ring is secured to the second inner containment ring by a first plurality of frangible tab members.

19. The turbine casing assembly as in claim 18, wherein the outer containment ring is secured to the first inner containment ring by a second plurality of frangible tab members.

20. A gas turbine engine, comprising:
a compressor section;
a combustor;
a turbine section; and
a turbine casing assembly, comprising:
an outer structural case; and
a containment ring, comprising:
a first inner containment ring, the first inner containment ring having a thickened main body portion, the thickened main body portion having a forward end and an aft end;
a second inner containment ring, the second inner containment ring having a thickened main body portion, the thickened main body portion having a forward end and an aft end;
an outer containment ring, the outer containment ring having a thickened main body portion, the thickened main body portion having a forward end and an aft end, the thickened main body portion of the outer containment ring being at least partially located between the aft end of the thickened main body portion of the first inner containment ring and the forward end of the thickened main body portion of the second inner containment ring, the first inner containment ring and the second inner containment ring being radially inward from the outer containment ring, wherein a radial space is located between the outer containment ring and the first inner containment ring and the second inner containment ring, the radial space allowing deformation of the first inner containment ring and the second inner containment ring to deform freely with regard to the outer containment ring, the first inner containment ring being aligned with a first stage rotor of the turbine section, the outer containment ring being aligned with a second stage rotor of the turbine section, and the second inner containment ring being aligned with a third stage rotor of the turbine section.

* * * * *